(12) United States Patent
Pereira et al.

(10) Patent No.: US 12,511,659 B2
(45) Date of Patent: Dec. 30, 2025

(54) ASSESSING TRANSACTIONAL GRAPHS BASED ON GENERATOR-DISCRIMINATOR NETWORKS

(71) Applicant: Feedzai—Consultadoria e Inovação Tecnológica, S.A., Coimbra (PT)

(72) Inventors: Ricardo Ribeiro Pereira, Guimarães (PT); Jacopo Bono, Esposende (PT); David Oliveira Aparício, Oporto (PT); Maria Inês Silva, Lisbon (PT); Miguel Ramos de Araújo, Oporto (PT); João Tiago Barriga Negra Ascensão, Lisbon (PT); Pedro Gustavo Santos Rodrigues Bizarro, Lisbon (PT)

(73) Assignee: Feedzai—Consultadoria e Inovação Tecnológica, S.A. (PT)

(*) Notice: Subject to any disclaimer, the term of this patent is extended or adjusted under 35 U.S.C. 154(b) by 597 days.

(21) Appl. No.: 17/940,932

(22) Filed: Sep. 8, 2022

(65) Prior Publication Data

US 2023/0111818 A1   Apr. 13, 2023

Related U.S. Application Data

(60) Provisional application No. 63/251,190, filed on Oct. 1, 2021.

(30) Foreign Application Priority Data

Aug. 12, 2022  (EP) .................................. 22190147

(51) Int. Cl.
*G06Q 30/01*   (2023.01)
*G06Q 30/018*   (2023.01)
(Continued)

(52) U.S. Cl.
CPC ......... *G06Q 30/018* (2013.01); *G06V 10/774* (2022.01); *G06V 10/82* (2022.01)

(58) Field of Classification Search
CPC .................................................. G06Q 30/018
See application file for complete search history.

(56) References Cited

U.S. PATENT DOCUMENTS

2020/0226512 A1* 7/2020 Epstein .................. G06Q 30/02
2020/0340955 A1* 10/2020 Wegner ............... G01S 15/8959
(Continued)

OTHER PUBLICATIONS

Nesterov, "Lectures on Complex Optimization", vol. 137, p. xiii, Springer (Berlin) 2018. (Year: 2018).*

(Continued)

*Primary Examiner* — Scott C Anderson
(74) *Attorney, Agent, or Firm* — Van Pelt, Yi & James LLP

(57) ABSTRACT

In various embodiments, a process for assessing transactional graphs based on generator-discriminator networks includes using a generator network to generate a first set of transaction graph samples that are of a generated type, wherein the generator network is trained to optimize a predetermined objective function. The process includes sampling, from a collected dataset, a second set of transaction graph samples that are of a non-generated type; and providing the first set of transaction graph samples and the second set of transaction graph samples to a discriminator network, wherein the discriminator network is trained to classify a provided transaction graph sample as the generated type or the non-generated type. The process includes discriminating, by the discriminator network, each of at least a portion of the first set of transaction graph samples and the second set of transaction graph samples as the generated type or the non-generated type.

20 Claims, 14 Drawing Sheets

(51) Int. Cl.
  *G06V 10/774*  (2022.01)
  *G06V 10/82*  (2022.01)

(56) References Cited

U.S. PATENT DOCUMENTS

| | | | | |
|---|---|---|---|---|
| 2020/0394364 | A1* | 12/2020 | Venkateshwaran | ... G06F 40/117 |
| 2021/0110457 | A1* | 4/2021 | Polanía Cabrera | .... G06V 20/00 |
| 2021/0117806 | A1* | 4/2021 | Liu | .......... G06F 17/16 |
| 2021/0163038 | A1* | 6/2021 | Huang | ................. G06V 20/58 |
| 2021/0294944 | A1* | 9/2021 | Nassar | ................ G05D 1/0088 |

OTHER PUBLICATIONS

Arjovsky et al., Wasserstein Generative Adversarial Networks, Proceedings of the 34th International Conference on Machine Learning, Sydney, Australia, PMLR 70, 24 pages, 2017.

Chen et al., Machine Learning Techniques for Anti-money Laundering (AML) Solutions in Suspicious Transaction Detection: A Review, Springer, Knowl Inf Syst, 2018.

De Cao et al., MolGAN: An implicit generative model for small molecular graphs, ICML 2018 workshop on Theoretical Foundations and Applications of Deep Generative Models, 11 pages, May 30, 2018.

Goodfellow et al., Generative Adversarial Nets, https://doi.org/10.48550/arXiv.1406.2661, arXiv:1406.2661 [stat.ML], pp. 1-9, 2014.

Lorenz et al., Machine Learning Methods to Detect Money Laundering in the Bitcoin Blockchain in the Presence of Label Security, ICAIF, Oct. 15-16, 2020.

Nair et al., Rectified Linear Units Improve Restricted Boltzmann Machines, ICML'10: Proceedings of the 27th International Conference on International Conference on Machine Learning, Haifa, Israel, pp. 807-814, Jun. 2010.

Unger et al., How to Dodge Drowning in Data? Rule- and Risk-Based Anti Money Laundering Policies Compared, Review of Law & Economics, vol. 5, Issue 2, Article 7, 953-985, 2009.

Watkins et al., Tracking Dirty Proceeds: Exploring Data Mining Technologies as Tools to Investigate Money Laundering, Journal of Policing Practice and Research: An International Journal, vol. 4, No. 2, ISSN 1561-4263, pp. 163-178, Jan. 2003.

* cited by examiner

A

B

C

ASSESSING TRANSACTIONAL GRAPHS BASED ON GENERATOR-DISCRIMINATOR NETWORKS

CROSS REFERENCE TO OTHER APPLICATIONS

This application claims priority to U.S. Provisional Patent Application No. 63/251,190 entitled GENERATIVE ADVERSARIAL METHOD TO TRAIN A MODEL TO DETECT MONEY LAUNDERING filed Oct. 1, 2021, which is incorporated herein by reference for all purposes.

This application claims priority to European Patent Application No. 22190147.3 entitled METHOD AND DEVICE FOR ASSESSING TRANSACTIONAL GRAPHS BASED ON GENERATOR-DISCRIMINATOR NETWORKS filed Aug. 12, 2022, which is incorporated herein by reference for all purposes.

BACKGROUND OF THE INVENTION

In many real-world applications concerning the detection of illicit activities, there is a label scarcity problem because fully labelled datasets are unavailable. This can, for example, be due to the incomplete detection of illicit activities, long investigation times of suspicious activities, etc. For example, money laundering investigations and subsequent criminal prosecutions can take years to complete, false social media accounts can escape detection, and illicit actors can continuously adapt their strategies.

Due to this lack of labelled datasets, it is challenging to train well-performing supervised machine learning models. A conventional solution is to use rule-based detection systems instead. The rule-based systems are typically designed by domain experts but are characterised by a high false positive rate. Another possibility is to use unsupervised training techniques. These aim to discover different patterns in the data, which can then be analysed to distinguish between normal behaviour and outlier behaviour. Unsupervised techniques can also be problematic because mostly the criminal actors try to mimic legitimate activities to avoid detection.

Another alternative is to use generative models to create a labelled artificial dataset. For example, Generative Adversarial Networks (GANs) focus on comparing the distribution of generated instances and the distribution of real instances via sampling and using an auxiliary parametric discriminator model. Using a small amount of labelled data is sufficient for a GAN to generate new (but artificial) examples of illicit activity, improving regular oversampling techniques. However, a small amount of labels is still required, and the generator cannot learn novel strategies beyond the ones present in the few labelled examples.

BRIEF DESCRIPTION OF THE DRAWINGS

Various embodiments of the invention are disclosed in the following detailed description and the accompanying drawings.

DETAILED DESCRIPTION

Figure 1:
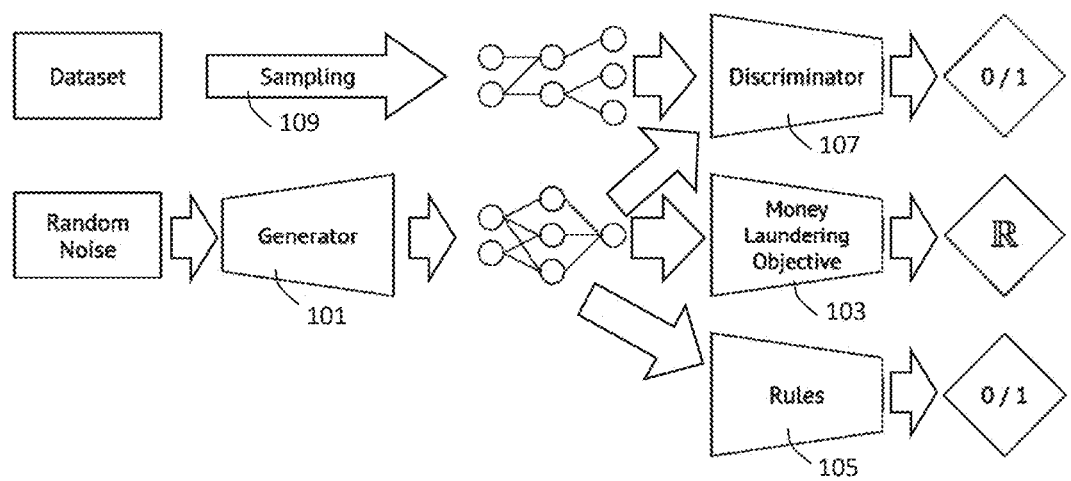
FIG. 1 shows an embodiment of a system for assessing transactional graphs based on generator-discriminator networks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional illicit activity detection systems are typically rule-based, capturing simple patterns, but resulting in high false-positive rates. Furthermore, many aspects of these conventional rule-based systems are set by regulators, so the rules are publicly known. Thus, opponents will know the rules of these rule-based systems and will operate to bypass those rules.

Conventional machine-learning solutions based on supervised learning require substantial amounts of labelled data, which often is unavailable (for example, in the money laundering domain where these behaviours are statistically minute and difficult to identify). Unsupervised methods can also be problematic because adversaries try to imitate legitimate behaviours in order to bypass those methods.

The present disclosure does not require labelled data. According to the present disclosure, the intent of adversaries can be known and thus can be modelled by incorporating it in the optimization objective, for example, money launderers may try to distance a destination of funds from their source in order to disguise a criminal origin.

Transactions include for example financial transfers between entities, ratings of items being reviewed by users, user-interface interactions by users, for example clicks from users in GUI elements, connections between user profiles in a social network platform, among other possibilities where entities are related by way of a 1-to-1 relationship.

In real-world applications concerning the detection of illicit activities, often the final objective of the illicit actors is known. For example, in the case of money laundering, criminal actors attempt to legitimise illegally obtained funds by concealing their origin, typically by using a complex network of financial transactions between various financial institutions and jurisdictions. In recommender systems, an illegal actor attempts to raise the rank of its product by creating false ratings through false accounts. The final objective may be leveraged as described in the disclosed techniques.

In various embodiments, a generator network (further described herein) incorporates the known final objective of the illicit actor as an optimization objective to train an artificial generator of illicit activity. This artificial illicit activity is used to train an illicit activity detector (e.g., a discriminator network). Hence, labelled examples are not required, and the disclosed techniques perform well even when very few or no labels are available.

The present disclosure relates to a method and device for assessing transactional graphs, based on generator-discriminator networks, optionally using a differentiable rule-based proxy of a rule-based system. In various embodiments, the disclosed techniques detect particular behaviour or transactional patterns that escape rule-based systems.

The present disclosure also relates to the capture of suspicious money laundering behaviour. In various embodiments, the disclosed techniques detect suspicious behaviour that escapes rule-based AML systems, among other types of suspicious activity. The set of transactions in a case to be analysed for money laundering detection is represented as, e.g., a tripartite graph, where a set of external accounts sends money to a set of internal accounts, which in turn sends part of the money to a set of external accounts, creating a money flow through the bank.

One of the advantages of the present disclosure is that real labelled cases, e.g., of money laundering are not required. Instead, a trainable data generator of money laundering examples is provided, where the generator reproduces money laundering patterns from domain knowledge, e.g., maximize money flows, and optionally evade a rules-based AML system. Additionally, a discriminative model can be trained to distinguish these generated fraudulent cases from real legitimate ones.

The present disclosure includes, in various embodiments:

A tensor representation for connected graphs of money flows through accounts in a banking institution, internal accounts, incoming from several sender external accounts, and outgoing to several receiver external accounts;

A high-fidelity approximation to a system of anti-money laundering (AML) rules, rules proxy. This takes the tensor representation as input and outputs a real value corresponding to a decision. The rules proxy mapping is differentiable;

A deep learning generator network architecture mapping a high dimensional random noise vector sampled from a prespecified probability distribution to an instance of the tensor representation, henceforth denoted as "generated data". In particular, the architecture does not attribute any meaning to the ordering of accounts within each group of accounts, including internal accounts, sender external accounts, or receiver external accounts, but produces outputs that are consistent with the sequential nature of time;

A method for sampling connected graphs of transactions from a real dataset represented as instances of the tensor representation, henceforth denoted "real data". The purpose of this sampling is to provide examples of legitimate, non-money laundering data.

A deep learning discriminator network architecture mapping an element of the tensor representation to a probability of the underlying data being real or generated. In particular, the architecture imposes permutation invariance on the output with respect to permutations within each group of accounts, including internal accounts, sender external accounts, or receiver external accounts.

An objective function that depends on the generator and noise distribution, as well as on the discriminator and real data distribution. The objective function contains one or more of the following sub-objectives, appropriately weighted by adjustable hyperparameters to control one or more of the following trade-offs:

a domain-knowledge defined money laundering objective for the generated data, e.g., favour the generation of graphs with large money flows and with little money blocked in internal accounts, a penalty for generating data that triggers the proxy-rules system, a penalty for generating data that is easy for the discriminator to distinguish from real data.

The objective function determines the optimal generator and discriminator. Conventionally, Generative Adversarial Networks (GAN) aim to make the generated data distribution indistinguishable from the real data distribution.

In an embodiment, additional terms in the objective shifts the focus of the generator to generate, instead, instances with a distribution close, but not equal, to the real data distribution while keeping the differences such that some money laundering is achieved while evading the rules system. Thus, in this configuration, the final discriminator has discriminative ability, so it can be used to assign money laundering risk scores to graphs of transactions or rank sets of graphs from most to least risky.

The trade-off between how close the data is to the real data or how close it is to the money laundering objective is controllable by the hyperparameters of the objective function.

Managing this trade-off closely resembles a real-life scenario where malicious agents want to quickly sanitize dirty assets while avoiding behaviour that could be perceived as suspicious.

Internal and external accounts are used as an embodiment. In the present disclosure, it could be any set of accounts.

FIG. 1 shows an embodiment of a system for assessing transactional graphs based on generator-discriminator networks. 101 represents a generator, 103 represents an objective function (e.g., a money laundering objective), 105 represents rules (e.g., AML rules), 107 represents a discriminator, and 109 represents a dataset sampler. The examples described herein refer to money laundering, but this is not intended to be limiting as the disclosed techniques may be applied to other situations.

A generator (101) is configured to produce synthetic money laundering samples-represented in the middle of the figure as a tripartite graph. In various embodiments, the generator's goal includes maximizing a money laundering objective function, e.g., the amount of money flowing through the bank (103), optionally without being detected by a pre-existing AML rules system (105).

A discriminator (107) is configured to distinguish generated samples from real data samples. The generated samples (also called synthetic samples) refer to samples generated by generator 101) in contrast with non-generated samples (also called real samples), which are based on real-world dataset. In various embodiments, the goal of the discriminator includes detecting the synthetic samples, which mimic instances of money laundering.

In various embodiments, a differentiable version of the rule-based system (105) provides gradient information to the generator. In this way, the generator (101) can learn to avoid triggering the rule-based system in specific embodiments.

A sampling strategy capable of selecting representative legitimate transactions (109) which, together with synthetic samples from the generator (101), are used to train the discriminator (107).

In various embodiments, a data representation is generated. The data representation (a tensor) includes a graph of transactions connecting a set of internal accounts of a bank to external accounts that send or receive money. For example, layering, which, in the example of money laundering, is characterized by complex networks of transactions across different financial institutions. In various embodiments, at least the following information regarding each transaction was available: the identification (id) of the sending account, the id of the receiving account, the amount being transferred, and the timestamp of the transaction. In the complex network of transactions, each bank only has records of transactions that involve its internal accounts. Thus, from the point of view of a bank that is trying to detect money laundering, the types of transactions involved can be divided into three types: an external source account, sending money to an internal account, an internal account sending money to another internal account, and an internal account sending money to an external destination account. For the example of layering, the internal-internal transactions can be ignored since they are not informative in various embodiments.

A dynamic transaction graph can be represented using unipartite, bipartite, tripartite, or multipartite, depending on the use case. For example, the relevant transactions are represented as a tripartite graph, where a set of external accounts transfers money to a set of internal accounts, which transfers money to a set of external accounts. The edges in this tripartite graph represent transactions between the corresponding pair of accounts, and the weight of the edge is the amount transferred.

Figure 2:
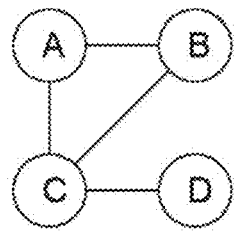
FIG. 2 shows examples of a unipartite graph (A), respective codification (B), and tensor (C).
Figure 2:
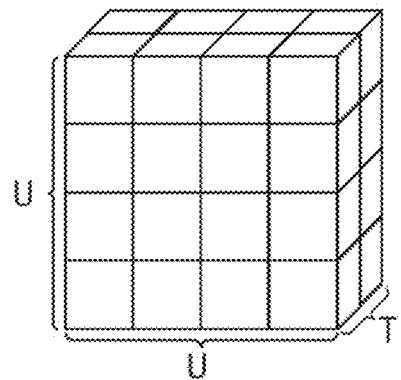

FIG. 2 shows examples of a unipartite graph (A), respective codification (B), and tensor (C). Table 1 below codifies this embodiment and shows an example of transactions in a unipartite graph.

| Connections | Day |
|---|---|
| (A, B) | 1 |
| (A, C) | 1 |
| (A, C) | 2 |
| (B, C) | 2 |
| (C, D) | 2 |

A dynamic graph, which can be directed or undirected, weighted, or unweighted, is represented using a 3D tensor. Each index in the first two dimensions represents one of the entities involved, e.g., users in a social network platform.

The third dimension represents time and includes the temporal information regarding when the transaction was made. The period is broken down into non-overlapping contiguous time units, e.g., days. All the transactions between a given pair of entities, or accounts, that fall in the same time unit are merged and represented as a single edge with weight equal to an aggregation (e.g., sum, count, mean) of the amount in those transactions. For example, in the AML use case, the value in each edge is equal to the total amount transferred between the corresponding pair of accounts in that time unit.

Figure 3:
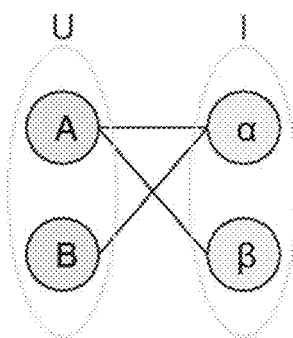
FIG. 3 shows examples of an embodiment of a bi-partite graph (A), respective codification (B), and tensor (C).
Figure 3:
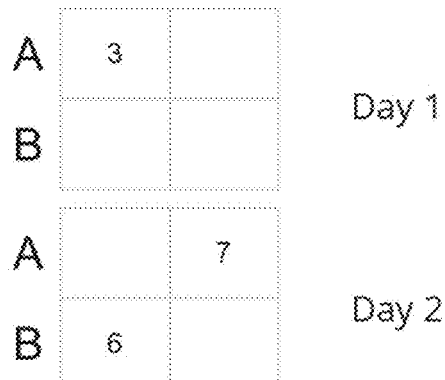
Figure 3:
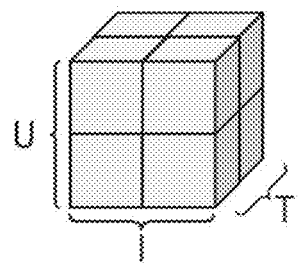

FIG. 3 shows examples of a bi-partite graph (A), respective codification (B), and tensor (C). Latin letters stand for a first entity kind (e.g., external) and Greek letters stand for a second entity kind (e.g., internal). Table 2 below codifies this embodiment and shows an example of transactions in a bipartite graph.

| User | Item | Rating | Day |
|---|---|---|---|
| A | α | 3 | 1 |
| A | β | 7 | 2 |
| B | α | 6 | 2 |

Figure 4:
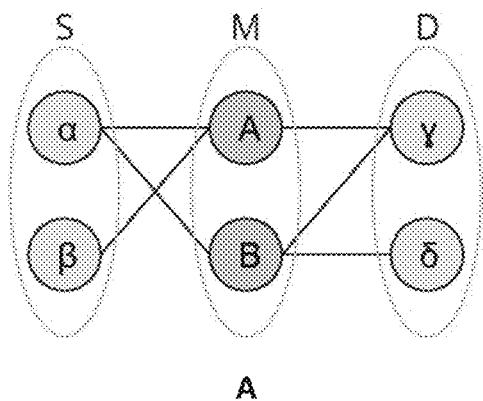
FIG. 4 shows examples of interactions between accounts in a tri-partite graph (A), respective codification (B), and tensor (C) of interactions between accounts.
Figure 4:
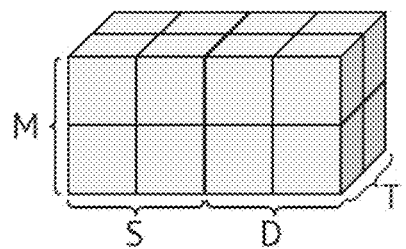

FIG. 4 shows examples of interactions between accounts in a tri-partite graph (A), respective codification (B), and tensor (C). Latin letters stand for internal accounts and Greek letters for external accounts. In this example, there are no records of external-external transactions since that information is not available to the bank, and internal-internal transactions are ignored.

The graph can be multipartite; in this case, the representation can be more efficient by assigning subsets of entities to the tensor's first and second dimensions. For example, the graph can be bipartite, e.g., user-item interactions, assigning users to dimension 1 and items to dimension 2, FIG. 3(A), or tripartite, e.g., source-middle-destination accounts in a banking system, assigning middle accounts to dimension 1 and source and destination accounts to dimension 2, FIG. 4(A).

| Source | Target | Amount | Day |
|---|---|---|---|
| α | A | 3.14 | 1 |
| α | A | 15.92 | 2 |

-continued

| Source | Target | Amount | Day |
|---|---|---|---|
| α | B | 65.35 | 1 |
| β | A | 89.79 | 1 |
| A | B | 32.38 | 2 |
| A | γ | 46.26 | 2 |
| B | γ | 43.38 | 1 |
| B | δ | 32.79 | 2 |
| B | δ | 50.28 | 2 |

This representation avoids having to generate sequences of transactions with variable size or having to directly predict timestamps for each transaction. This way, the format of the data generated and classified is known, thus allowing any type of deep learning model to be used. Also, in various embodiments, the AML rules have the smallest time unit, so there is no need to have a finer time granularity than that time unit.

A specific tensor representation is discussed for this example with, e.g., the constraint that there are no transactions between internal accounts for illustrative purposes. However, more general representations are possible, e.g., by having internal accounts along the second dimension of the tensor side by side with the external accounts. Furthermore, different representations can be implemented for use-cases different than AML, as discussed above. Generally speaking, the representation is common to the output of the generator, of the sampling strategy, as well as the input of the discriminator, objective function, and, if applicable, the rules.

In this specific example of AML, this is a 3D tensor of non-negative real numbers with shape (M, S+D, T), where the value of each entry is the amount of money being transferred between two corresponding accounts on the corresponding day.

Several options to obtain a differentiable proxy for the rules system will now be described.

In various embodiments, a differentiable proxy for a rules-based AML system (or more generally, a rules system) improves the system's ability to identify suspicious activity. In one aspect, one of the optimization objectives of the generator is to avoid producing transactions that trigger the rules, since those transactions are already detected by the rules-based AML system. An improved system would focus on discriminating between money laundering that avoids such triggers and real data. In various embodiments, weak spots in current AML systems are detected by generating synthetic money laundering data that can go undetected, and then training the discriminator to detect/identify those money laundering strategies.

In various embodiments the generator (101) learns to avoid triggering the rule-based AML system based on feedback on how the number of rule triggers changes as it adapts its parameters. However, it may be challenging to directly use the rule-based system (105) because a conventional rule-based system is typically not differentiable and therefore cannot provide gradient information in the backpropagation step, which is conventional for training deep neural networks.

In various embodiments, a neural network is trained to serve as a proxy for the rules to provide gradient information. The output of the generator is then input to this proxy network. In this way, if the generator's output triggers any scenario of the rule-based system, the proxy network provides gradient information to the generator on how to update its learnable parameters to avoid being detected again in the future.

In various embodiments, the proxy network is configured to label each internal account periodically, e.g., each day, according to whether the respective account it triggered any of the scenarios of money laundering. This proxy network receives a 3D tensor of shape (M,S+D,T) as input and outputs a 3D tensor of shape (M,R,T), where R is the number of rule scenarios to be mimicked. The entries in its output have a value of 1 if the corresponding internal account triggered the corresponding rule scenario on the corresponding day, otherwise the value is 0. For example, suppose a given set of transactions would only trigger the third scenario because of transactions made by the second internal account on the seventh day. In that case, every entry of the output tensor should be 0, except for entry (1,2,6) which should be 1.

In various embodiments, a tensor that predicts whether any rule was triggered is output.

In various embodiments, the network architecture includes two sequential blocks: profiling and prediction.

In the profiling block, the rule proxy network aggregates information from the input tensor to calculate profiles for each internal account. For example, one of the profiles extracted could be the sum of transaction amounts sent in the past 7 days. This is achieved using convolutional layers that slide across the second or third dimensions.

In the prediction block, the rule proxy network combines the profiling features to decide whether they meet the required conditions to trigger each rule scenario. Again, having the profiles, each decision can be made independently, always using the same logic, for every point in time. As such, this can be implemented as convolutional layers that slide across the second dimension, always making the same combination of profiles to make the prediction.

The known logic of rules can be used to implement the network architecture described herein. Several options can be considered to include inductive biases, based on such logic, to facilitate the convergence of the learning process. The first option is to have both the profiling and prediction blocks fully learnable, meaning that the network learns all the weights and biases from the examples, as in conventional supervised learning. The second option is to implement the logic of the profiling block, meaning that the first layers' parameters, weights, and biases are set to some fixed values that correspond to the calculation of the profiles used by the rule system while having the prediction block learnable. The third option is to manually implement the logic of the profiling and the prediction blocks.

In an embodiment of the rules proxy network, every parameter of the network is learnable. Consequently hyperparameters, e.g., the number of layers and sizes of the kernels, are tuneable without requiring any other parameters to be tuned In the profiling block, some inductive bias may be introduced by choosing the dimensions for the convolutional filters to allow for combinations of the tensor components that the original rules would combine. For example, since it is known that the rules use profiles based on the total amount received or sent by an internal account, the filter sizes can be configured to match the number of source or destination accounts and never mix these two types of accounts. Furthermore, the sizes of temporal filters can be chosen as natural time intervals, e.g., one week, one month. The first layers extract profiling features with real meaning using combinations of these values as kernel sizes. The output of this set of layers is a (M,F,T) tensor, where F is the number of features extracted from the input.

In the prediction block, convolutional layers with 1D kernels are used, with lengths equal to the number of features of the previous layer, that slide across the first and third dimensions of the tensor. The output of the proxy network is a (M,R,T) tensor with the predictions.

In various embodiments, the profiling block is implemented with fixed weights (e.g., manually), and the learnable layers are provided in the prediction block. Using this architecture, the first few layers of the network are forced to calculate the same profiles that the rules use. As such, better predictive performance is expected since there are fewer parameters to learn and the information is optimally pre-processed.

For example, consider a case where, in the profiling block, to mimic the rules-based AML system, several combinations of total amounts and counts of transactions are needed, both coming from and going to external accounts, during various time periods. Starting from the original (M,S+D,T) (M,F,T) tensor, a tensor is obtained, where the second dimension, in this example F=6, contains:

The number of incoming transactions,
The total dollar amount of incoming transactions,
The number of outgoing transactions,
The total dollar amount of outgoing transactions,
The number of transactions with round amounts,
The dollar amount of transactions with round amounts.

In an embodiment, the function ReLU(2·sigmoid(x)−1) is used to map amounts into counts. Importantly, this is just one example, and there are various other ways to add count information. For example, a function can be used to detach operations from the computational graph in the backward pass. In that way, one can map the non-zero amounts to 1 in the forward pass but keep the original amounts in the backward pass.

To count transactions, the (M,S+D,T) tensor is copied, and the function is applied to each of its entries. This operation has the effect of mapping every entry with a positive amount to be close to 1 while leaving the empty ones unaltered. This function is a smooth version of the Heaviside step function. In various embodiments, the gradient is non-zero for x>0 and the level of smoothing can be adjusted to a specific function (e.g., the function ReLU (2·sigmoid(x)−1) is not essential). This defines the smoothed-out versions of the count aggregations described herein.

To find the round amount transactions, i.e., transactions with an amount that is a multiple of 10000, the input tensor is copied, and the function $$ReLU\left(500\ \cos\frac{2\pi x}{10000} - 499\right)$$

is applied to each of its entries. This operation maps every real number to 0, except near the multiples of 10000 which have "hills" that peak at 1. This specific implementation of smoothing is but an example and not intended to be limiting. With this example function, the round amount entries can be selected by multiplying the corresponding result of the smoothed-out indicators applied to the amounts tensor by the amounts tensor. The smoothed out counts or sums are then followed by the sum of the corresponding smoothed round amounts or round indicators tensor over external accounts as appropriate.

Figure 5:
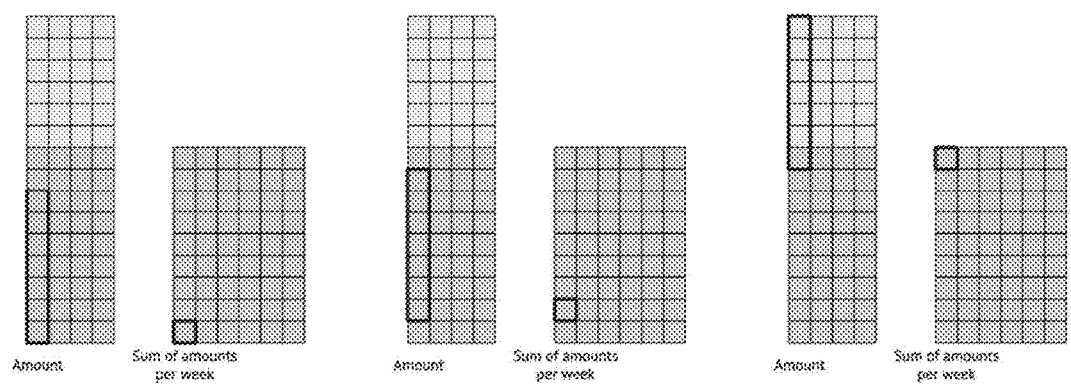
FIG. 5 shows an example of using a convolution layer to calculate profiles.

FIG. 5 shows an example of using a convolution layer to calculate profiles.

In various embodiments, the next aggregation in the profiling is over the desired time windows, e.g., one week, two weeks, one month, six months, and ten months, each of which can be implemented as a convolution filter of the desired size, moving along the third dimension of the (M,F,T) tensor. In various embodiments, to keep the temporal dimension the same size, the tensor is padded in one side, with a number of entries equal to the length of the kernel minus 1. In this example, this results in a (M,30,T) tensor, 6 features times 5 time windows.

Two extra features are added to signal the padding of the biggest time filters since some of the rule scenarios are based on averages, and the padding zeros may skew these values unknowingly. Therefore, two features are added with 1's in the last six/ten months, signalling padding, and 0's elsewhere, to mark the days that may be affected by padding values. The output of this set of layers is a (M,22,T) tensor.

In various embodiments, next, in the prediction block, the same learnable layers architecture is used as the fully learnable network. The output of the proxy network is a (M,R,T) tensor with the predictions.

In various embodiments, rules are implemented completely inside a neural network with fixed parameters. For example, the weights and biases for all operations inside the network are manually selected and fixed. This is expected to yield labels substantially identical to the original rules without requiring training.

In the profiling block, the process described with respect to the semi-learnable architecture may be used in various embodiments.

In various embodiments, in the prediction block, the profiles are combined in order to mimic the logic behind each rule scenario. The conditions of the rule scenarios can typically be expressed as linear combinations of the profiles that have already been calculated. The selection of weights and biases of the convolution filters, like the ones used before in the learnable layers, and using a ReLU activation function, causes the triggers of each condition in one layer to be calculated. Positive values correspond to the smoothed-out version of the original condition being met (1), otherwise, a 0 value corresponds to the condition not being met for example.

In various embodiments, conditions are combined using logic operations of conjunctions and disjunctions. A disjunction operation can be implemented by adding the values corresponding to the conditions. If at least one of the conditions of the proxy rules is met, then the corresponding output is positive. Since these values are expected to be always non-negative, then the sum is positive, which translates to a trigger, effectively implementing a disjunction.

A conjunction operation can be implemented in various ways. In one approach, a minimum operation is used, which is positive if all conditions are positive. This option has the property that the gradient only flows through the entries of the tensor that are responsible for the minimum value. This can be a desirable property because, if there is a situation where, for example, the amount is substantially above its threshold, but the number of transactions is just slightly above its threshold, then the generator can learn to not trigger this rule scenario by creating examples with fewer transactions but with the same total amount. However, this highly targeted feedback can cause the generator to output transactions with a larger variation of amounts or that trigger the rules more often and make the training process of the generator more unstable.

Another approach for implementing the conjunction operation is to use a function that removes operations from the computational graph when performing backpropagation. This function is referred to as a detach function. Different behaviours can be obtained during the forward and the backward pass using this function. For example, x/\y can be implemented by (min(x,y)−(x+y),detach( )+(x+y). In the forward pass, the (x+y) terms cancel out, and the previous solution is left. However, in the backward pass, the detached part is ignored, and an addition that distributes the gradient fairly is left.

In various embodiments, the generator is configured to generate artificial money laundering examples. In various embodiments, the data format that is used to represent the transactions, i.e., the format of the output of the generator, is a tensor. For this example, it is a 3D tensor of shape (M,S+D,T). The first dimension runs over the set of internal accounts, the second dimension runs over the external accounts, and the third dimension runs over the set of time steps. Each entry of the tensor is either 0, no transaction, or the value of the amount transferred.

In various embodiments, the shape of the output tensor is fixed. This allows the use of convolutional layers instead of a recurrent neural network architecture but imposes a restriction on the size of the generated patterns. As such, the money laundering patterns that the generator creates have an upper bound on the number of accounts and time span of the transactions.

In various embodiments, the generator architecture is includes three blocks: (1) a block of dense layers, gradually mapping a noise vector to a coarse temporal representation of interactions between accounts, (2) a block of transposed convolutional layers, gradually refining the temporal representation of interactions between accounts up to a single day, and (3) a block of transformations that is configured to ensure the sparsity of the tensor and make the number of transactions independent from the amount.

In various embodiments, the output can also be scaled by a constant amount in order to speed up training. Since the model starts with small random values for its parameters, it would take several epochs before learning to generate a high number of transactions in a stable way. So, this optional step of the generator of multiplying its output by a constant amount larger than 1 can be beneficial. Other operations, such as exponentiating or taking logarithms, can be used in various use cases.

Figure 6:
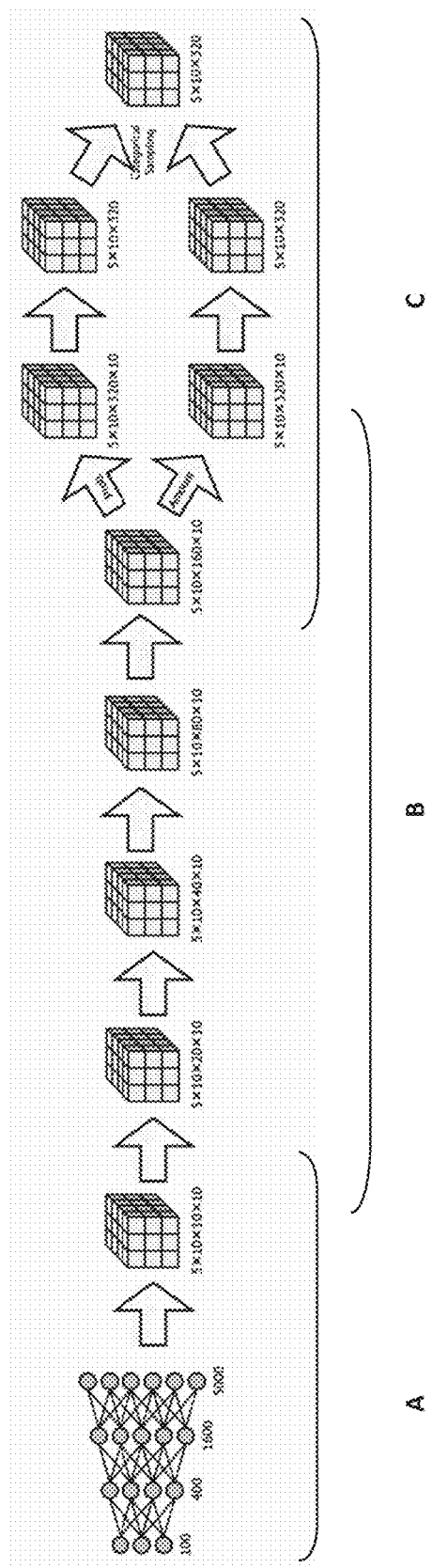
FIG. 6 shows an embodiment of a generator network.

FIG. 6 shows an embodiment of a generator network. In this example of a full generator architecture, the generator comprises a first stage of generator (A) to map noise to coarse temporal tensor, second stage of the generator (B) to increase time granularity, and a third stage of the generator (C) to make the tensor sparse.

In various embodiments, one of the objectives is to be able to create complex patterns of money laundering that involve multiple accounts that act together in an organized way. As such, the present generator needs to be able to coordinate transactions between various (e.g., all) different pairs of accounts. Because of this, typical GAN architectures for image generation based on convolutions are not a good fit since, in this use case, there is no clear notion of locality, whereas, in image generation, neighbouring pixels tend to be similar. In this example where a 3D output tensor is used, the order of internal accounts, the first dimension, and external accounts, the second dimension, does not bear, a priori, any meaning. Only the third dimension, which is encoding the timestamp of the transactions, has a clear ordering and could potentially show, for example, some seasonal behaviour.

To generate money laundering operations with coordinated accounts without imposing local behaviour, the network is configured with a first set of fully connected layers that upscale the original input noise vector into a larger vector. Then it is reshaped to a tensor with one additional dimension than the target output tensor, specifically in our example, a 4D tensor of shape (M,S+D,$T_0$,F), as exemplified in FIG. 7. The first two dimensions already encode what is wanted to output, but the size of the third dimension is significantly smaller than what is wanted to generate. One can interpret each (1,1,1,F) slice of this tensor as a feature vector of length #encoding the interactions between a pair of accounts in a time window spanning several days of the final output. This provides a coarse temporal representation of the behaviour of accounts to be refined in subsequent layers.

The second block of the network is configured to gradually increase the time granularity of the tensor created in the first block. To do this, transposed convolutional layers are used with filters that slide across the time dimension and encompass all features of the previous layers.

In transaction networks, each account only sends/receives money to/from a limited number of accounts compared to the total number of people in the network. It is not expected that every account sends/receives money daily to/from every other account. As such, if the disclosed 3D tensor representation for the transactions is used, the tensor is expected to be very sparse, with the great majority of entries being 0.

Figures 9, 10:
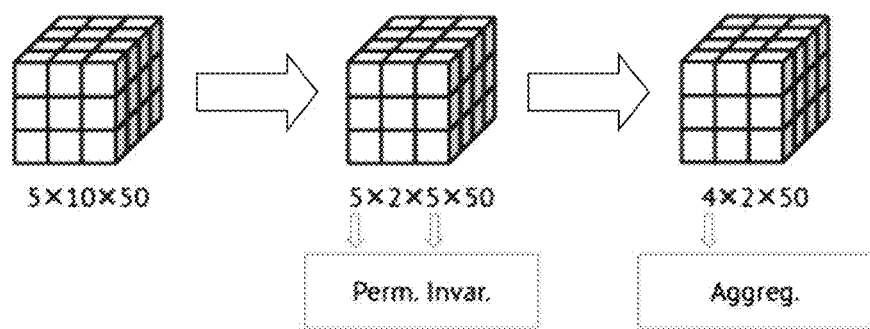
FIG. 9 shows an embodiment of a permutation invariant aggregation.
FIG. 10 shows an embodiment of the second stage of the discriminator configured to enforce account permutation invariance.

To enforce this sparsity, some of the entries in the tensor are randomly sampled to contain a transaction. This can be achieved, for example, by branching the output tensor from the previous stage into two tensors: one to contain the amounts of each potential transaction and another to contain the probability of the corresponding transactions occurring, an example of which is shown in FIG. 9. Each branch has its own transposed convolutional layers to allow some independence between the probability and the amount of each transaction. Also, the last layer maps the tensors that have one extra dimension, 4D in the example, into the final tensor shapes, respectively, 3D, consistent with the target output, i.e., the additional dimension is collapsed, one with the amount of information and the other with the probability. The last activation function of the amount tensor is the Sofiplus(x)=log($e^x$+1), which is very similar to the RedU=max(0,x) function described herein but is always strictly greater than 0, a desired property for the entries of the amount tensor. The last activation function of the probability tensor is a Sigmond=1/(1+$e^{-x}$), to ensure that the result is a value between 0 and 1.

The categorical sampling step is done via Bernoulli sampling on the probability tensor, where each of the entries becomes 1 with probability as given by the entry in the tensor and 0 otherwise. For example, a random number (from a set of uniformly distributed random numbers) is generated for each entry. The entry is assigned a value of 1 if the generated number is larger than the entry. Otherwise, the entry is assigned a value of 0. Then, to select the corresponding amounts to obtain the final output of the generator, the Bernoulli sampled tensor is multiplied element-wise by the amount tensor, an example of which is shown in FIG. 10. The backpropagation step is then performed on the probabilities themselves because the Bernoulli sampling is not differentiable.

This approach not only solves the problem of making the output tensor very sparse but also introduces some randomness, ergo some variability, to the generated data and allows sampling of transactions with probability somewhat independent from the amount, e.g., transactions with a low amount and high probability or vice-versa.

The discriminator includes a deep learning model that classifies transactions as real, e.g., from a real dataset, or synthetic, e.g., from the generator. During training, the discriminator is fed both types of instances and, as such, sampling transactions from a real dataset is necessary in various embodiments.

For the case of AML, samples should come from the real distribution of transactions and be small enough to fit in the present data representation in various embodiments. However, in typical applications, it may be desirable to not make it too easy for the discriminator to distinguish between real and synthetic data, e.g., sampling a small number of low-amount transactions is not ideal since this is the opposite of the expected behaviour for the objective for the generated data.

In various embodiments, all accounts in each of the internal and external samples belong to the same connected component.

Three different sampling methods that were tested in an experimental study will now be described. These are merely examples and not intended to be limiting, and other sampling methods can be chosen.

The first method is a simple random walk. The only restriction is that the number of source, internal, and destination accounts cannot become larger than the maximum size allowed by the data representation. So, in each step of the random walk, when selecting the next node to jump to among the neighbours of the current node, nodes that do not already belong to the sample are ignored if they belong to a set that has already been filled. For example, if a node is a source account that does not belong to the sample yet, but has already reached the maximum number of source accounts that fit in the data representation, it is not considered a candidate for which to jump next. Sampling of nodes stops when (1) a predetermined maximum number of jumps is reached or (2) the sample has the maximum number of source, internal and destination accounts that fit in the data representation.

The second method is to follow the order of a breadth-first search. To build each sample, a seed node is selected at random and a queue is filled with its neighbours. Then, the front of the queue is popped to select the next node to add to the sample and insert its unseen neighbours on the queue. Here, the same restriction applies: one does not want more than the maximum number of source, internal, and destination accounts, so every time that one pops or is about to insert a node in the queue belonging to an already filled set, it is ignored. Sampling of nodes stops when (1) the queue is empty or (2) the sample has the maximum number of source, internal and destination accounts that fit in the data representation.

A third option is to perform community detection on the graph of transactions. A hierarchical clustering algorithm can be used to extract communities that fit inside the data representation. If it is of the agglomerative type, the process begins from a seed node and stops before its cluster becomes too large to fit inside the data representation. If it is divisive, the seed node starts in the same cluster as every other node, so the process stops once its cluster becomes small enough to fit inside the data representation. The cluster is verified to represent a tripartite graph, with at least one node in each of the three sets. This cluster becomes the sample.

Figure 7:
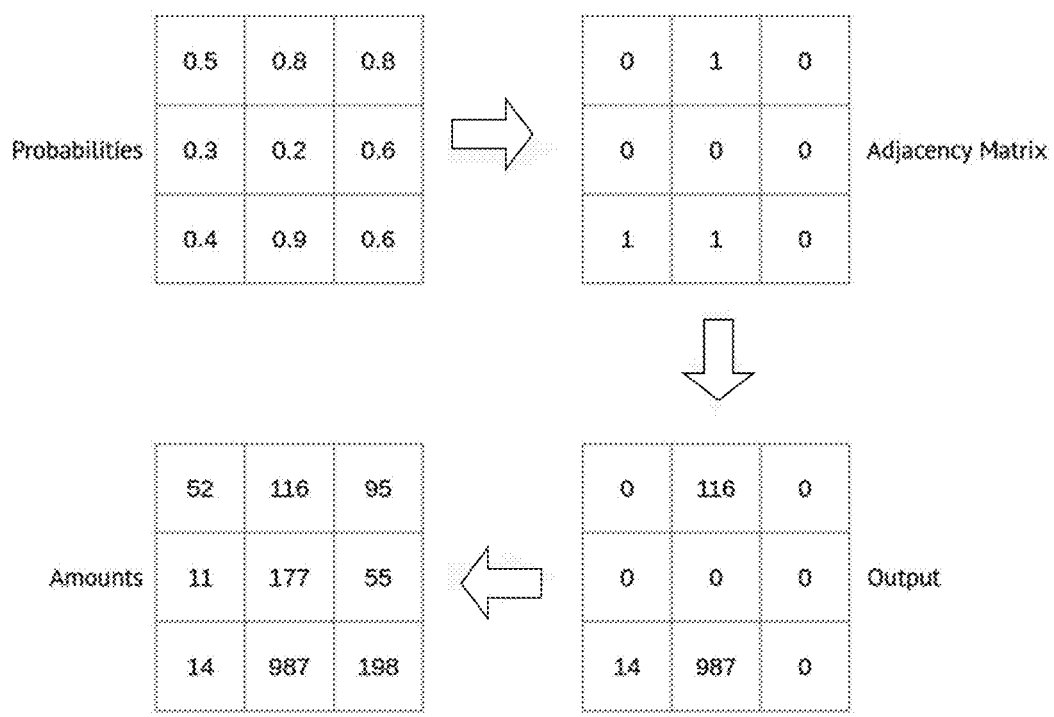
FIG. 7 shows an embodiment of the categorical sampling operation.

FIG. 7 shows an embodiment of the categorical sampling operation.

The sampling strategy and the generator architecture discussed herein provide the input for the discriminator (107), which will now be described. In various embodiments, an objective of the discriminator machine learning model component is to complement the traditional rules-based AML system (105). Since in the AML example, the generator (101) is trained to create transactions that launder as much money as possible without triggering the rules, its outputs can be used as positive instances of money laundering. Using the previously discussed sampling strategy, one can sample instances that fit within the data representation and use them as negative instances of money laundering. So, the discriminator is trained to solve a classification problem: given a set of transactions represented as previously described, identify the ones that are money laundering and the ones that are not.

In various embodiments, the discriminator architecture is a slightly modified mirror image of the generator, including three blocks: (1) a block of convolutional layers, gradually reducing the temporal granularity of the interactions between accounts, (2) an aggregation block configured to predict the discriminator permutation invariant concerning the order of the accounts, and (3) a block of dense layers, mapping the features extracted by the previous stages to a single output, the class prediction.

Figure 8:
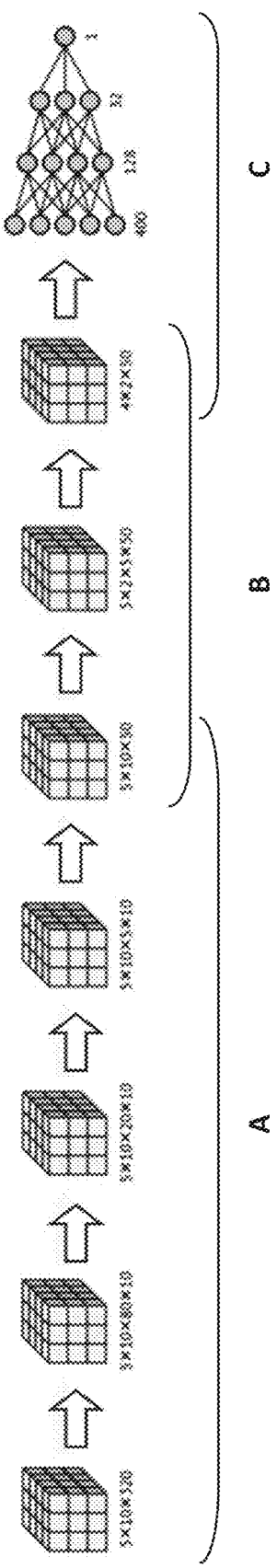
FIG. 8 shows an embodiment of a discriminator network.

FIG. 8 shows an embodiment of a discriminator. In this example of a full discriminator architecture, the discriminator comprises a first stage (A) to decrease time granularity, a second stage (B) to enforce account permutation invariance, and a third stage (C) to map feature tensor to prediction. This discriminator is an example of discriminator 107.

First, the size of the time dimension is decreased to be less computationally intensive, using convolutional layers with filters that slide across the time dimension of the tensor, gradually shrinking this dimension's size. In various embodiments, expressivity is increased by adding an additional dimension of fixed size to the intermediate tensors, similar to what was described in the generator's architecture, which then collapses at the end of this block, an example of which is shown FIG. 12. The result, in this example, is a 3D tensor where the first dimension runs over internal accounts, and the second dimension runs over external accounts. A(1,1,X) slice of the tensor can be seen as a feature vector that is encoding the behaviour of transactions between the corresponding pair of accounts.

In various embodiments, the discriminator is permutation invariant concerning the order of the entities. That is, only the topology of the graph and the amounts transacted at the edges is relevant. Thus, the internal accounts and the external accounts in the tensor can be in any order. In various embodiments, for the external accounts in the second dimension, source accounts are only swappable with other source accounts, in the first half of this dimension, and destination accounts are only swappable with other destination accounts, in the second half of this dimension, since they represent different types of counterparties of the internal accounts. The order of the entries in the time dimension of the original input tensor maps directly to the passage of time, so seasonality or local behaviours would be reflected by the order of the entries.

FIG. 9 shows an embodiment of a permutation invariant aggregation.

Figure 13:
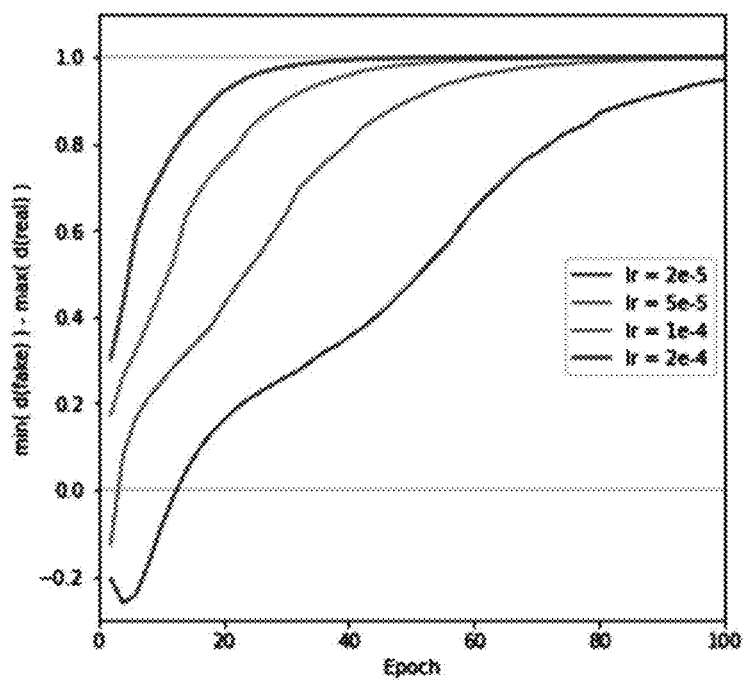
FIG. 13 shows an example of results from fine-tuning the discriminator with various learning rate values.
Figure 14:
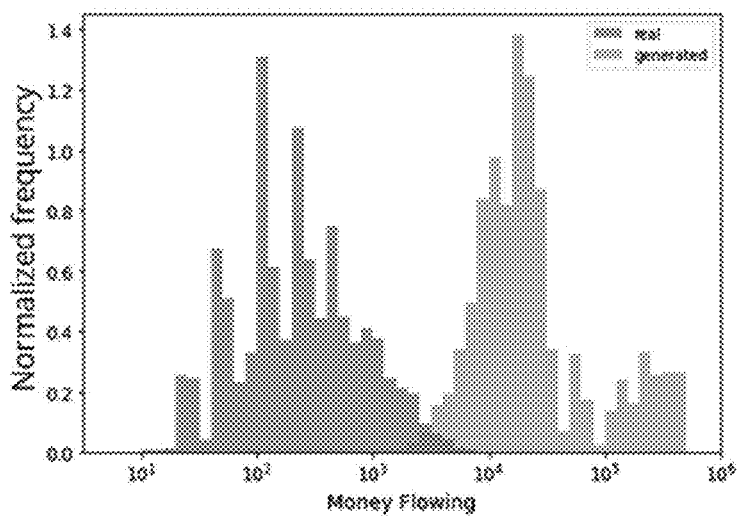
FIG. 14 shows an example of results for a generator.

After the decrease in time granularity, there is one feature vector representing the transactions between each pair of accounts. Next, the second dimension is split into two parts: one regarding the transactions from source accounts, and one regarding the transactions to destination accounts, an example of which is shown in FIG. 14. Returning to FIG. 9, in this example, a 4D tensor is obtained where the dimensions that are permutation invariant are the first, internal, and the third external. Any number of commutative functions can be applied to aggregate these dimensions into features, for example, the maximum, minimum, mean, standard deviation, an example of which is shown in FIG. 13. The result is a 3D tensor where the first dimension relates to the aggregations that were used. For example, using the mean and maximum as aggregation functions would lead to a first dimension of size two, where the first index would contain the mean of value over all accounts and the second index would contain the maximum. The second dimension of size two corresponds to the type of transaction, incoming or outgoing from the point of view of the internal accounts. In the third dimension, there are features that were extracted from the tensor.

FIG. 10 shows an embodiment of the second stage of the discriminator configured to enforce account permutation invariance.

In this example, this tensor is reshaped, which can already be made significantly smaller than the input, into a 1D vector of features and use a set of dense layers to make the final prediction of the discriminator. In various embodiments, if the goal is to make a binary classification of the input tensor, using the cross-entropy loss, the last activation function can be a sigmoid, meaning that the output of the discriminator will be a value between 0 and 1.

Various optimization objectives and how they fit with the disclosed data representation and function parametrization techniques will now be described.

In the case of a rule-based AML system, a goal of the generator may include avoiding the rule-based AML system while mimicking money laundering. In the specific example of layering, money flows may be created based on a classical pattern used by mule accounts: they receive large volumes of money through the financial system and subsequently send it again in order to hide its illicit origins. Also, it is known, from consulting with domain experts, that money launderers do not usually leave much money in the internal account for a long time because the faster the money gets to its final destination, the less likely it is for money launderers to be apprehended. Furthermore, since, in this example, deposits and withdrawals are not considered, the amount of money that an internal account sends should not be much bigger than what it receives. Consequently, an example goal is to maximize the amount of money flowing, while minimizing the amount of money blocked (e.g., transferred from a source to the internal account and then not leaving), and created (e.g., an internal account sending much more money than what it receives). This goal is referred to as a mule's objective or the money laundering objective.

Defining as x the total amount of money incoming to an internal account and the outgoing money as y, then one way to formalize the mule's objective is maximizing the function:

$$\Lambda_{flow}(x,y)=x+y-\beta|x-y| \quad (3)$$

The term (x+y) is responsible for maximizing the amount flowing, while the term |x−y| attempts to minimize the amount of money blocked and created. The parameter β controls the relative strength of the balancing term. Another example with a similar effect is the function $\Lambda_{flow}(x,y)=\sqrt{xy}$.

A money laundering objective (e.g., the mule's objective) is used to measure the money laundering quality of the example and the proxy network in place of the rule base AML system to detect the triggers. So, in other words, the generator is trained to maximize the money laundering objective, e.g., Eq. 3, while minimizing the predicted label of the proxy network. These two loss functions are adversarial in nature, in the sense that the money laundering objective will push the generator towards the opposite behaviour compared to the proxy network loss. A hyperparameter α can be used to balance the strength of these two loss functions. As such, the generator will be trained to minimize the loss function:

$$\Lambda=(1-\alpha)\Lambda_{proxy}-\alpha\Lambda_{flow}. \quad (4)$$

$\Lambda_{flow}$ stands for the loss from the money laundering objective function, e.g., the output of the function from Eq. 3. $\Lambda_{proxy}$ stands for the loss from the proxy network, which is dependent on the version of the proxy network. If the fully learnable or semi-learnable versions are used, where the last activation function is a Sigmoid, then the loss is the binary cross entropy BCE(x,y)=−y log(x)−(1−y)log(1−x), where x is the predicted value and y is the target label. Here the proxy output x=proxy(G(z)) is interpreted as the probability of the instance triggering the rules, so the target label of the generator is y=0, i.e., the rules are never triggered. Thus, in this case, the proxy loss simplifies $\Lambda_{proxy}(G(z))=-\log(1-proxy(G(z))$. If the fully manual version is used, where the last activation function is a ReLU, then the loss can be the output of the proxy network, thus achieving a similar objective.

Figure 11:
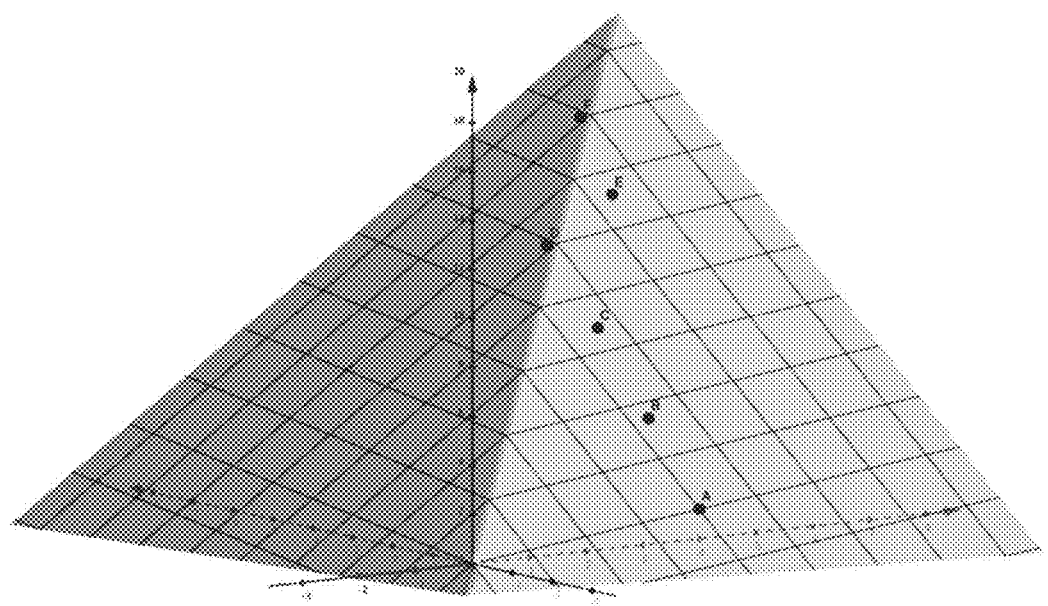
FIG. 11 shows an embodiment of an expected learning trajectory given a $\Lambda_{flow}$ (x,y) objective function.

FIG. 11 shows an embodiment of an expected learning trajectory given a Λflow (x,y) objective function.

In various embodiments, similar to conventional GANs, the discriminator's objective is to discriminate between real and generated data. A possible loss function is the binary cross entropy loss of Eq. (2). A goal of the discriminator is to maximize the discriminative power, so the first term maximises the probability of assigning a positive label to real examples, and the second one maximizes the probability of assigning a negative label to generated samples. In various embodiments, the generator focuses on the opposite objective of confusing the discriminator, i.e., to minimize these quantities. In practice, for example, the training of the disclosed system may alternate between adjusting the generator and adjusting the discriminator. If the discriminator is fixed, the second term of the objective function can be assigned to a third money laundering objective for the generator, whereas if the generator is fixed, the full GAN loss is needed to train the discriminator. Other losses that are used for GANs, such as the Wasserstein loss, can be used instead of the binary cross entropy.

In various embodiments, on the iterations where the discriminator is fixed, as discussed previously, a new term in the loss function is included, corresponding to the discrimination loss for the generator. A hyperparameter α is introduced to balance the strength of the money laundering flow objective relative to the losses from the AML system, rules proxy, and discriminator, while a new hyperparameter γ regulates the relative importance given to the losses due to the rules proxy network and the discriminator. As such, the generator is trained to minimize the loss function:

$$\Lambda=(1-\alpha)(\gamma\Lambda_{proxy}+(1-\gamma)\Lambda_{disc})-\alpha\Lambda_{flow}. \quad (5)$$

$\Lambda_{disc}$ stands for the loss from the discriminator, which can also be chosen according to the type of GAN that is used. If the original GAN loss is used, $$\Lambda_{disc}(G(z))=\log(1-D(G(z))). \quad (5)$$

The disclosed system can be optimized in various ways. One possibility is to first train only the generator using the illicit activity objective and optionally the pre-existing system. The discriminator is then trained while keeping the generator fixed. This process can be iterated one or more times, where each iteration refines the generator and discriminator separately. Another possibility is to optimize the generator and discriminator jointly, similar to GAN training. How close the generator converges to the real data and, consequently, how confident the discriminator is of its prediction depends on the choice of hyperparameters (α and 7.

Results from experiments in the AML use-case applied to a real-world banking dataset are presented. The inputs are represented using a tensor representation as mentioned earlier. The generator and discriminator architectures, as discussed earlier, are optimized jointly. A proxy network for an existing AML rules system is implemented using the fully manual approach discussed earlier. A grid search over various hyperparameters is performed to find the best settings (in this example, the metric used is to move as much money as possible through internal accounts without triggering any rule).

Figure 12:
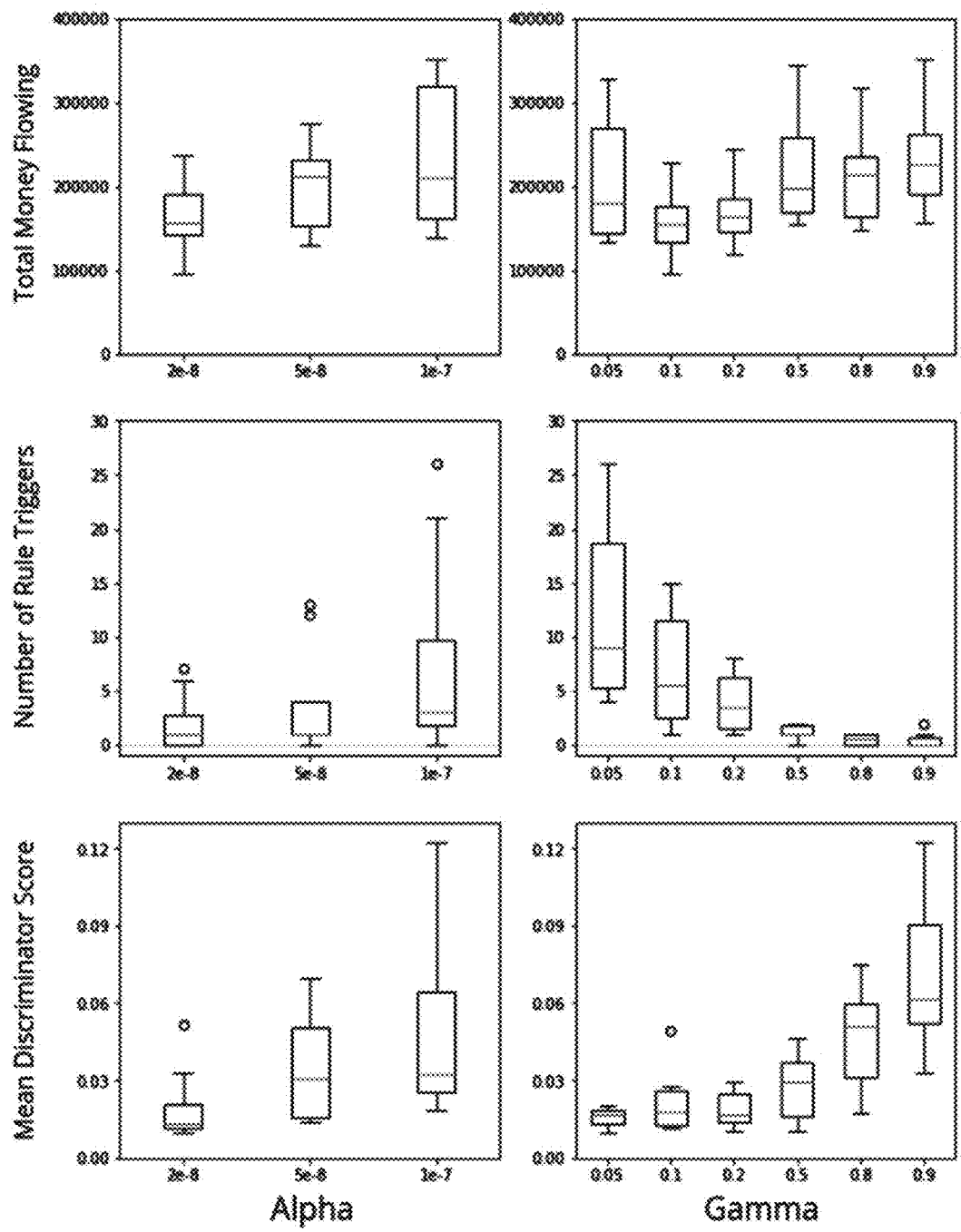
FIG. 12 shows an example of results from performing a grid search of an improved generator's hyperparameters.

FIG. 12 shows an example of results from performing a grid search of an improved generator's hyperparameters.

In order to mimic the adaptive behaviour of the money launderers to a new AML solution, a generator may be improved upon by taking into account the added goal of avoiding triggering the discriminator. That is, the goal in this example is to train a generator that is capable of fooling the first discriminator as well as the rules system. During this experiment, the parameters of the discriminator were fixed, i.e., the discriminator is not re-trained to adapt to the generator's behaviour.

Using the parameters of the first generator as initial parameters for the neural network, training is performed in the same manner as described herein for other embodiments. Hyperparameters are fixed to be the same as the ones used to train the first generator unless otherwise described. For example, batch size is set to 16, $\beta$ is set to 0.9, the scaling factor is set to 100, the learning rate is set to 5×10−5, and a proxy_min version of the proxy network was used. The proxy_min version of the proxy network refers to a version of the network in which a minimum operation is used for the conjunction of conditions in the prediction block. Another example version of the proxy network is proxy_detach in which a detach function is used for the conjunction of conditions in the prediction block.

Grid search was performed over various values of α and 7, and how these hyperparameters affect the total amount of money flowing through the internal accounts in the generated samples, as well as the number of rule triggers and the mean score attributed by the discriminator were measured. Two runs were performed for each combination of hyperparameters, letting the generator train for 250 epochs. An epoch was defined as 16 batches. To evaluate the generator performance, how much money the generator was able to launder (total amount of money flowing through internal accounts) without triggering the rules (no positive labels attributed to the output tensor of the generator) in more than half of the generated examples and having an average discriminator score smaller than 0.08 (the maximum discriminator score for real examples) was measured.

FIG. 13 shows an example of results from fine-tuning the discriminator with various learning rate values. It shows the performance of the discriminator across the epoch of the training, for various values of learning rate. The performance is depicted as previously described, measuring the gap between the scores of the positive and negative classes. It is seen that the discriminator approaches a perfect model, requiring less epochs than before.

FIG. 14 shows an example of results for a generator. In this example, the system using this generator performs the best of all systems tested. The empirical distribution of money flowing through internal accounts for samples of real data, in a dark colour, and generated data, in light colour, as shown. The generated samples result in significantly higher money flows. None of the generated samples trigger existing rules.

A test set was prepared with samples from various trained generators and samples from real data. The detection of generated samples was investigated for a variety of trained discriminators, each trained with various hyperparameters during the grid search mentioned above.

Figure 15:
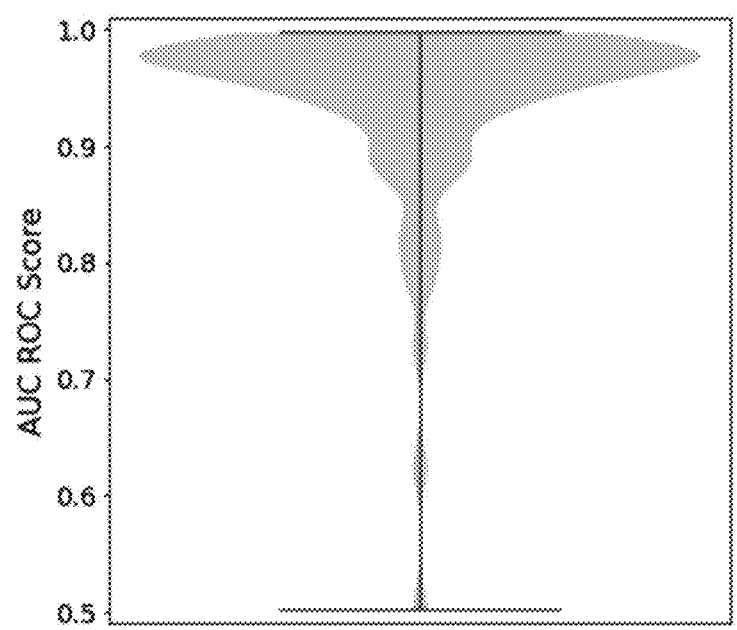
FIG. 15 shows an example of an Area Under ROC (AUC) curve for various discriminators on the test set.

FIG. 15 shows an example of an Area Under ROC (AUC) curve for various discriminators on a test set. As shown, many discriminators reach an AUC close to 1, indicating near-perfect performance.

The experimental study presented shows that given a fixed AML system in place, and a money laundering goal, it is possible to train a discriminator to differentiate between legitimate cases and cases that are generated to evade the AML system and maximise the money laundering objective, after training the generator using feedback from the AML system and the money laundering objective.

Figure 16:
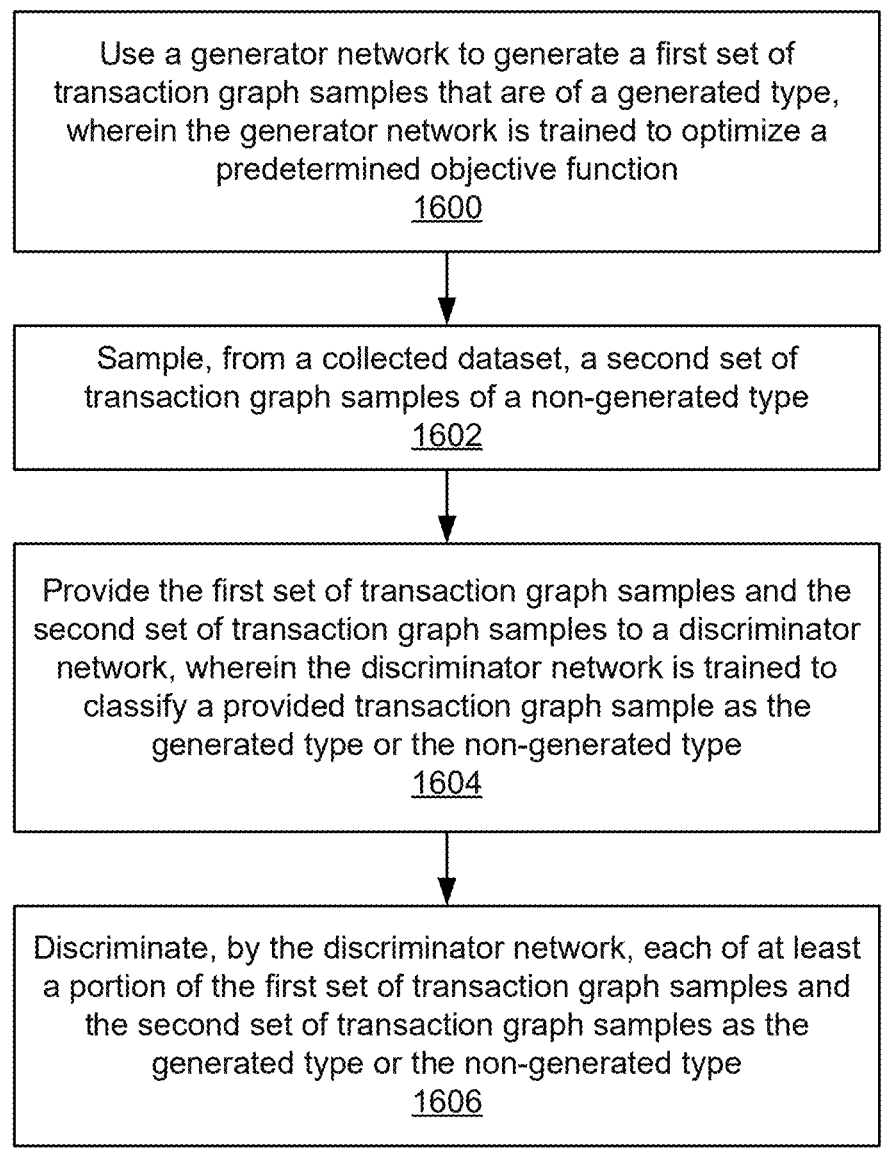
FIG. 16 is a flow chart illustrating an embodiment of a process for assessing transactional graphs based on generator-discriminator networks.

FIG. 16 is a flow chart illustrating an embodiment of a process for assessing transactional graphs based on generator-discriminator networks. The process can be performed by a system such as the one shown in FIG. 1.

The process begins by using a generator network to generate a first set of transaction graph samples that are of a generated type, wherein the generator network is trained to optimize a predetermined objective function (1600). An example of a generator network is generator 101 of FIG. 1. In one use case, the generator network can be used to solve a label scarcity problem by generating samples with which to train a discriminator network, as further described herein. In other words, the generator network simulates behavior of a malicious actor trying to avoid detection by a fraud detection system (such as a rules system 105).

As described herein, the objective function can be (pre)determined to optimize performance of the generator network and/or the discriminator network. Hyperparameters of the objective function can be selected to balance a trade-off between (i) how close generated samples are to real (non-generated) data (e.g., mimics real data) and (ii) how close generated samples are to a money laundering objective.

With respect to objective function optimization, in various embodiments, an objective function is either a reward function (variously called a reward function, a profit function, a utility function, a fitness function, etc.), in which case it is to be maximized, or a loss function (variously called a cost function, an error function, etc.), in which case it is to be minimized. The present disclosure uses a reward function as example, but this is not intended to be limiting as a loss function can be used.

A transactional graph sample may include (graph) nodes representing (transactional) entities and edges representing transactions between the entities.

For example, the transactional entities can be bank accounts, internal and external, and the transactional amount is transferred funds. In another example, the transactional entities are users and items being rated by those users, and the transactional amount is the rating given by users to items. In yet another example, the transactional entities are users and items, and the transactional amount is the amount or value of items being bought and sold between users. The time dimension may be day or week, for example, the transactional amount being aggregated from hourly or daily data, respectively. The process samples, from a collected dataset, a second set of transaction graph samples of a non-generated type (1602). As described herein, a sampling strategy that selected representative legitimate transactions may be used. Unlike transaction graph samples of a generated type (sometimes simply called "generated"), which are generated by a generator, samples of a non-generated type are not generated by such a generator. Instead, they may be samples from real (world) data for example.

The process provides the first set of transaction graph samples and the second set of transaction graph samples to a discriminator network, wherein the discriminator network is trained to classify a provided transaction graph sample as the generated type or the non-generated type (1604). An example of a discriminator network is discriminator 107 of FIG. 1.

The process discriminates, by the discriminator network, each of at least a portion of the first set of transaction graph samples and the second set of transaction graph samples as the generated type or the non-generated type (1606). By being able to distinguish between generated and non-generated samples, the discriminator is able to determine whether graph samples are from real world data or are synthetic data. This can be helpful in detecting whether illicit activities are taking place. For example, money launderers may attempt to conceal transactions using a generator, product makers may attempt to raise the rank of a product by creating fake reviews using a generator, etc.

The term "comprising" whenever used in this document is intended to indicate the presence of stated features, integers, steps, and components, but not to preclude the presence or addition of one or more other features, integers, steps, components, or groups thereof.

The disclosure should not be seen in any way restricted to the embodiments described and a person with ordinary skill in the art will foresee many possibilities for modifications thereof. The above-described embodiments are combinable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    generate, by a generator network, a first set of transaction graph samples that are of a generated type, wherein;
        the generator network is trained to optimize, using a predefined number of data samples, a predetermined objective function; and
        at least one of the first set of transaction graph samples includes:
            graph nodes representing entities,
            graph edges between the graph nodes representing transactions between the entities, and
            at least one graph edge has an associated transactional amount that aggregates a transactional amount for zero or more transactions between two entities represented by graph nodes for a predetermined time period;
    sampling, from a collected dataset, a second set of transaction graph samples that are of a non-generated type includes at least one of:
    (i) performing a random walk of the collected dataset including by:
        selecting a random seed node from the collected dataset and adding the random seed node to the second set of transaction graph samples; and
        until a tensor dimension corresponding to a neighboring node is already complete:
            selecting a neighboring node of a currently selected node as a newly selected node; and
            adding the newly selected node to the second set of transaction graph samples;
    (ii) performing a breadth-first search of the collected dataset including by:
        selecting a random seed node from the collected dataset as a currently selected node; and
        adding neighboring nodes of the currently selected node to a back of a queue, removing a node from a front of the queue, selecting the removed node as the currently selected node, and adding a newly selected node to the second set of transaction graph samples until at least one of: a tensor dimension corresponding to a neighboring node or a tensor dimension corresponding to the removed node is complete;
    (iii) selecting a random seed node from the collected dataset and growing a cluster of nodes from the collected dataset as a non-generated transaction graph sample until any of tensor dimensions of the non-generated transaction graph sample is complete; or
    (iv) performing a hierarchical clustering divisive algorithm, including by:
        selecting a random seed node and a corresponding cluster of subgraph connected nodes from the collected dataset; and
        thinning the cluster of nodes from the collected dataset as the non-generated transaction graph sample;
    wherein a graph sample that is of the non-generated type is not generated by the generator network;
    providing the first set of transaction graph samples and the second set of transaction graph samples to a discriminator network, wherein the discriminator network is trained to classify a provided transaction graph sample as the generated type or the non-generated type; and
    discriminating, by the discriminator network, each of at least a portion of the first set of transaction graph samples and the second set of transaction graph samples as the generated type or the non-generated type.

2. The method of claim 1, wherein the generator network is trained to avoid detection by a differentiable transaction-graph sample assessment system.

3. The method of claim 1, wherein at least one of the first set of transaction graph samples is associated with at least one of:
    a unipartite graph, the unipartite graph including a set of nodes corresponding to transactional entities;
    a bipartite graph including:
        a first set of nodes corresponding to a first set of transactional entities, and
        a second set of nodes corresponding to a second set of transactional entities, the second set of nodes being independent from the first set of nodes; or
    a tripartite graph including:
        a first set of nodes corresponding to external source transactional entities,
        a second set of nodes corresponding to internal transactional entities, and
        a third set of nodes corresponding to external destination transactional entities, the first set of nodes, the second set of nodes, and the third set of nodes being independent from each other.

4. The method of claim 3, wherein the graph with which the at least one of the first set of transaction graph samples is associated is stored as a tensor data record, the tensor data record including at least one of:
for the unipartite graph:
  a first dimension corresponding to the transactional entities, and
  a second dimension corresponding to the transactional entities;
for the bipartite graph:
  a first dimension corresponding to the first set of transactional entities, and
  a second dimension corresponding to the second set of transactional entities; or
for the tripartite graph:
  a first dimension corresponding to the internal transactional entities, and
  a second dimension corresponding to the external source transactional entities and the external destination transactional entities.

5. The method of claim 4, wherein the external source transactional entities and the external destination transactional entities of the second dimension of the tensor data record are non-overlapping in the second dimension.

6. The method of claim 4, wherein generating the first set of transaction graph samples using the generator network, comprises:
providing, to the generator network, a one-dimensional source of random noise;
upscaling the random noise input using a set of fully connected neural network layers into a one-dimensional upscaled random noise input; and
reshaping the upscaled input into a tensor with the same number of dimensions as a graph tensor.

7. The method of claim 6, further comprising:
branching the reshaped tensor into a probability tensor and an amount tensor;
sampling the probability tensor, wherein sampled tensor values are assigned the value of one or zero based at least on a probability defined by the respective tensor value in the probability tensor; and
multiplying the sampled tensor values by corresponding amounts from the amount tensor to obtain an output tensor.

8. The method of claim 1, wherein discriminating each of at least the portion of the first set of transaction graph samples and the second set of transaction graph samples as the generated type or the non-generated type includes:
applying, to a fed transaction graph tensor, a set of fully connected neural network layers sliding over one or more transactional entity dimensions to obtain a transformed tensor;
applying a permutation invariant aggregation to the transformed tensor, the permutation being invariant with respect to an order of one or more transactional entity dimensions;
reshaping the permutation invariant aggregated tensor into a one-dimensional feature vector; and
using a set of fully connected neural network layers for predicting whether the provided transaction graph sample is the generated type or the non-generated type.

9. The method of claim 1, wherein:
at least one of the first set of transaction graph samples is represented by a tensor data record, the tensor data record including a time dimension discretized according to a predetermined time duration; and
the time dimension is split into non-overlapping contiguous time periods of the time duration.

10. The method of claim 3, wherein the graph with which the at least one of the first set of transaction graph samples is associated is stored as a tensor data record, the tensor data record including:
a first dimension corresponding to the transactional entities, and
a second dimension corresponding to the transactional entities, and
a third dimension corresponding to time.

11. The method of claim 10, wherein generating the first set of transaction graph samples using the generator network, comprises:
providing, to the generator network, a one-dimensional source of random noise;
upscaling the random noise input using a set of fully connected neural network layers into a one-dimensional upscaled random noise input;
reshaping the one-dimensional upscaled random noise input into a coarse temporal tensor having an additional dimension compared with a graph tensor;
applying, to the coarse temporal tensor, a set of transpose convolutional layers having transposed convolutional filters that are slidable across a time dimension for gradually obtaining a tensor with increased time granularity over the time dimension; and
removing the additional dimension by aggregating along the additional dimension of the obtained tensor with increased time granularity into a generated tensor having the same dimensions as the graph tensor.

12. The method of claim 11, further comprising:
branching the generated tensor with increased time granularity into a probability tensor and an amount tensor;
applying, to the probability tensor and the amount tensor, a set of transposed convolutional layers having transposed convolutional filters that are slidable across a time dimension for gradually obtaining the probability tensor and the amount tensor with increased time granularity over the time dimension;
collapsing an additional dimension of the probability tensor and the amount tensor with increased time granularity into the probability tensor and the amount tensor having the same dimensions as a graph tensor;
sampling the collapsed tensor, wherein sampled tensor values are assigned the value of one or zero based at least on a probability defined by the respective tensor value in the collapsed probability tensor; and
multiplying the sampled tensor values by corresponding amounts from the collapsed tensor to obtain the generated tensor.

13. The method of claim 10, wherein discriminating each of at least the portion of the first set of transaction graph samples and the second set of transaction graph samples as the generated type or the non-generated type includes:
applying to a fed transaction graph tensor a set of convolutional layers having convolutional filters which are slidable across a time dimension for gradually obtaining a tensor with decreased time granularity over the time dimension;
adding an additional dimension to the fed transaction graph tensor by a layer of the set of convolutional layers;
collapsing the additional dimension of the tensor with decreased time granularity into a collapsed tensor having the same dimensions as the graph tensor;

applying a permutation invariant aggregation to the collapsed tensor, the permutation being invariant with respect to an order of one or more transactional entity dimensions;
reshaping the permutation invariant aggregated tensor into a one-dimensional feature vector; and
using a set of fully connected neural network layers for predicting whether the provided transaction graph sample is the generated type or the non-generated type.

14. The method of claim 1, wherein the training of the generator network and the training of the discriminator network is at least one of: carried out in parallel, carried out in sequence, or carried out iteratively in parallel or in sequence.

15. A system, comprising:
a processor configured to:
  generate, by a generator network, a first set of transaction graph samples that are of a generated type, wherein:
    the generator network is trained to optimize, using a predefined number of data samples, a predetermined objective function; and
    at least one of the first set of transaction graph samples includes:
      graph nodes representing entities,
      graph edges between the graph nodes representing transactions between the entities, and
      at least one graph edge has an associated transactional amount that aggregates a transactional amount for zero or more transactions between two entities represented by graph nodes for a predetermined time period;
  sample, from a collected dataset, a second set of transaction graph samples that are of a non-generated type includes at least one of:
  (i) performing a random walk of the collected dataset including by:
    selecting a random seed node from the collected dataset and adding the random seed node to the second set of transaction graph samples; and
    until a tensor dimension corresponding to a neighboring node is already complete:
      selecting a neighboring node of a currently selected node as a newly selected node; and
      adding the newly selected node to the second set of transaction graph samples;
  (ii) performing a breadth-first search of the collected dataset including by:
    selecting a random seed node from the collected dataset as a currently selected node; and
    adding neighboring nodes of the currently selected node to a back of a queue, removing a node from a front of the queue, selecting the removed node as the currently selected node, and adding a newly selected node to the second set of transaction graph samples until at least one of: a tensor dimension corresponding to a neighboring node or a tensor dimension corresponding to the removed node is complete;
  (iii) selecting a random seed node from the collected dataset and growing a cluster of nodes from the collected dataset as a non-generated transaction graph sample until any of tensor dimensions of the non-generated transaction graph sample is complete; or
  (iv) performing a hierarchical clustering divisive algorithm, including by:
    selecting a random seed node and a corresponding cluster of subgraph connected nodes from the collected dataset; and
    thinning the cluster of nodes from the collected dataset as the non-generated transaction graph sample;
  wherein a graph sample that is of the non-generated type is not generated by the generator network;
  provide the first set of transaction graph samples and the second set of transaction graph samples to a discriminator network, wherein the discriminator network is trained to classify a provided transaction graph sample as the generated type or the non-generated type; and
  discriminate, by the discriminator network, each of at least a portion of the first set of transaction graph samples and the second set of transaction graph samples as the generated type or the non-generated type; and
a memory coupled to the processor and configured to provide the processor with instructions.

16. The system of claim 15, wherein the generator network is trained to avoid detection by a differentiable transaction-graph sample assessment system.

17. The system of claim 15, wherein the training of the generator network and the training of the discriminator network is at least one of: carried out in parallel, carried out in sequence, or carried out iteratively in parallel or in sequence.

18. A non-transitory computer readable medium including a computer program product, wherein the computer program product comprises computer instructions for:
  generating, by a generator network, a first set of transaction graph samples that are of a generated type, wherein:
    the generator network is trained to optimize, using a predefined number of data samples, a predetermined objective function; and
    at least one of the first set of transaction graph samples includes:
      graph nodes representing entities,
      graph edges between the graph nodes representing transactions between the entities, and
      at least one graph edge has an associated transactional amount that aggregates a transactional amount for zero or more transactions between two entities represented by graph nodes for a predetermined time period;
  sampling, from a collected dataset, a second set of transaction graph samples that are of a non-generated type includes at least one of:
  (i) performing a random walk of the collected dataset including by:
    selecting a random seed node from the collected dataset and adding the random seed node to the second set of transaction graph samples; and
    until a tensor dimension corresponding to a neighboring node is already complete:
      selecting a neighboring node of a currently selected node as a newly selected node; and
      adding the newly selected node to the second set of transaction graph samples;
  (ii) performing a breadth-first search of the collected dataset including by:
    selecting a random seed node from the collected dataset as a currently selected node; and adding neighboring nodes of the currently selected node to a back of a queue, removing a node from a front of the queue, selecting the removed node as the currently selected node, and adding a newly selected node to the second set of transaction graph samples until at least one of: a tensor dimension corresponding to a neighboring node or a tensor dimension corresponding to the removed node is complete;

(iii) selecting a random seed node from the collected dataset and growing a cluster of nodes from the collected dataset as a non-generated transaction graph sample until any of tensor dimensions of the non-generated transaction graph sample is complete; or (iv) performing a hierarchical clustering divisive algorithm, including by:
 selecting a random seed node and a corresponding cluster of subgraph connected nodes from the collected dataset; and
 thinning the cluster of nodes from the collected dataset as the non-generated transaction graph sample;

wherein a graph sample that is of the non-generated type is not generated by the generator network;

providing the first set of transaction graph samples and the second set of transaction graph samples to a discriminator network, wherein the discriminator network is trained to classify a provided transaction graph sample as the generated type or the non-generated type; and discriminating, by the discriminator network, each of at least a portion of the first set of transaction graph samples and the second set of transaction graph samples as the generated type or the non-generated type.

19. The non-transitory computer readable medium of claim 18, wherein the generator network is trained to avoid detection by a differentiable transaction-graph sample assessment system.

20. The non-transitory computer readable medium of claim 18, wherein the training of the generator network and the training of the discriminator network is at least one of: carried out in parallel, carried out in sequence, or carried out iteratively in parallel or in sequence.

* * * * *